Patented June 6, 1939

2,160,941

UNITED STATES PATENT OFFICE 2,160,941

VINYLIDENE CHLORIDE CO-POLYMERS

Edgar C. Britton, Clyde W. Davis, and Fred Lowell Taylor, Midland, Mich., assignors to The Dow Chemical Company, Midland, Mich., a corporation of Michigan No Drawing. Application April 1, 1938, Serial No. 199,497

12 Claims. (Cl. 260—80)

This invention relates to the product obtained by polymerizing together monomeric vinylidene chloride and the monomer of at least one unsaturated ester of a monocarboxylic acid, the alcohol residue in the ester having the general formula

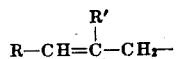

wherein one of the radicals R and R' is hydrogen, R is hydrogen, the phenyl radical, or a lower alkyl radical such as methyl, ethyl or propyl, and R' is hydrogen, halogen, or lower alkyl radical.

We have found that a variety of useful synthetic resinous and plastic products may be prepared by the copolymerization of vinylidene chloride and one or more unsaturated esters of monocarboxylic acids wherein the alcohol residue has the general formula given above. Such materials, herein referred to as co-polymers, may be prepared by heating together a mixture of the co-polymerizable materials at temperatures from about room temperature up to about 100° C. We have ordinarily deemed it expedient to carry out the copolymerization in the presence of catalysts capable of accelerating the said reaction. Such catalysts include, for example, light, benzoyl peroxide, a mixture of benzoyl peroxide, chloro-acetyl chloride, and tetraethyl lead, or a mixture of uranium nitrate or acetate and benzoyl peroxide, and the like. When uranium salts were employed in the catalyst mixture, the polymerizable materials were ordinarily subjected to the radiant energy from a mercury vapor lamp.

The co-polymers produced after subjecting the monomeric mixture to the conditions outlined above for a period varying from a few hours to about 3 weeks, depending upon the activity of the particular mixture, varied in properties from gel-like materials to spongy solids and through bone-like materials to hard brittle masses. Most of the products obtained were capable of being molded easily at moderate working temperatures. Some of the co-polymers, however, lack the necessary coherence to be readily molded. The softening point of all of the co-polymers produced was substantially lower than that of polymeric vinylidene chloride alone while in most cases the decomposition temperature of the co-polymer was substantially the same as that of polymeric vinylidene chloride.

Our new co-polymers are, in the main, insoluble in boiling ortho-dichlorobenzene. A few of the materials have been found to swell under the action of ortho-dichlorobenzene at its boiling point and in a few isolated instances, there appears to be some actual solution or dispersion of the co-polymer in the said solvent. The insolubility of most of our co-polymers in ortho-dichlorobenzene and similar solvents even at high temperatures is an indication of their general utility in the preparation of solvent-proof compositions.

Many of our new co-polymers are highly resistant to attack by concentrated sulphuric caid. Some of the materials discolor slightly on long standing in this reagent but do not appear to be decomposed thereby to any appreciable extent. It may be said in general that the co-polymers defined by the appended claims are quite resistant to the action of most common acids and alkalies and of most of the common organic solvents including the alcohols, hydrocarbons, chlorinated hydrocarbons, ketones, etc.

The following table illustrates the practice of our invention and describes some of the principal properties of various of our new co-polymers of vinylidene chloride and an unsaturated ester of the class described. In the table such ester is referred to as a "modifier", from its effect in modifying the properties of the co-polymer as compared with those of polymeric vinylidene chloride itself. Proportions of reagents are given in per cent by weight and the amount of modifier entering into the co-polymeric product is calculated from the chlorine analysis of the co-polymer obtained.

Table

| Run No. | Co-polymerizable material | Percent modifier | Percent vinylidene chloride | Polymerization temperature, °C. | Time, hours | Extent of polymerization, percent | Properties of co-polymeric products | | | | | |
|---|---|---|---|---|---|---|---|---|---|---|---|---|
| | | | | | | | Percent chlorine content | Percent vinylidene chloride | Percent modifier | Softening point, °C. | Decomposition temperature, °C. | Molding temperature, °C. |
| 1 | Allyl crotonate | 28.6 | 71.4 | 30 | 28 | 24.3 | 69.40 | 94.8 | 5.2 | 130 | 170 | 178 |
| 2 | Chloroallyl crotonate | 25.0 | 75.0 | 40 | 190 | 55.5 | 64.48 | 83.0 | 17.0 | 120 | 180 | 178 |
| 3 | ....do | 50.0 | 50.0 | 40° for 75 hrs. / 60° for 40 hrs. | | 45.5 | 47.91 | 51.7 | 49.3 | 140 | 200 | 178 |
| 4 | Allyl n-caproate | 25.0 | 75.0 | 30 | 66 | 28.0 | 70.08 | 95.7 | 4.3 | 140 | 205 | |
| 5 | Chloroallyl naphthenates | 25.0 | 75.0 | 30 | 142 | 27.7 | 67.15 | 90.3 | 9.7 | 140 | 200 | 170 |
| 6 | Allyl cinnamate | 10.0 | 90 | 40° for 56 hrs. / 60° for 16 hrs. | | 26.2 | 70.03 | 95.6 | 4.4 | 175 | 190 | |

Table—Continued

| Run No. | Co-polymerizable material | Percent modifier | Percent vinylidene chloride | Polymerization temperature, °C. | Time, hours | Extent of polymerization, percent | Properties of co-polymeric products ||||||
|---|---|---|---|---|---|---|---|---|---|---|---|---|
| | | | | | | | Percent chlorine content | Percent vinylidene chloride | Percent modifier | Softening point, °C. | Decomposition temperature, °C. | Molding temperature, °C. |
| 7 | Allyl furoate | 10 | 90 | 40° for 56 hrs. / 60° for 16 hrs. | | 19 | 70.52 | 96.3 | 3.7 | 184 | 194 | |
| 8 | Cinnamyl cinnamate | 10 | 90 | 60° for 56 hrs. / 40° for 16 hrs. | | 9.7 | 69.85 | 95.5 | 4.5 | 184 | 188 | |
| 9 | Allyl, p-(beta-hydroxyethoxy) cinnamate | 10 | 90 | 60° for 56 hrs. / 40° for 16 hrs. | | 15.3 | 68.84 | 94.1 | 5.9 | 183 | 193 | |
| 10 | Allyl methacrylate | 2 | 98 | 40 | 24 | 20.3 | 69.78 | 95.3 | 4.7 | 157 | 210 | |
| 11 | 2-chloroallyl cinnamate | 10 | 90 | 60° for 56 hrs. / 40° for 16 hrs. | | 27 | 68.68 | 93.8 | 6.2 | 165 | 210 | |

The examples have shown the preparation of co-polymers of vinylidene chloride with allyl or 2-chloroallyl esters of crotonic, n-caproic, furoic, methacrylic, cinnamic, substituted cinnamic, and naphthenic acids. These naphthenic esters were prepared from a commercially available mixture of naphthenic acids. Similar esters of cinnamic and furoic acids have been co-polymerized with vinylidene chloride as have the cinnamyl and crotonyl esters of crotonic, cinnamic, caproic, and furoic acids. Other similar esters which have been co-polymerized with vinylidene chloride include 2-methyl allyl n-butanoate, 2-methyl allyl benzoate, 2-chloroallyl acetate, allyl acetate, and 2-methyl allyl acetate. In all cases the esters employed in the preparation of the co-polymer contained an unsaturated alcohol group of the type previously defined. The acids from which the esters were prepared were all monocarboxylic acids, some of which were unsaturated straight-chain acids while others were unsaturated aryl-substituted straight-chain acids, saturated straight-chain acids, saturated cyclic acids, or saturated heterocyclic acids.

While this invention contemplates principally the co-polymers from a binary polymerizable mixture of vinylidene chloride and the previously defined unsaturated esters of monocarboxylic acids, it also includes co-polymers from polynary polymerizable mixtures comprising vinylidene chloride, the monocarboxylic acid esters, and one or more additional polymerizable materials. For example, to provide a co-polymer which, when molded, will neither dissolve nor swell in boiling ortho-dichlorobenzene, a small amount, i. e., from 0.5 to 2.0 per cent of allyl methacrylate may be added to the monomeric mixture prior to polymerization.

Our new co-polymers may be further modified in their physical properties and general appearance and utility by incorporating therein various effect materials, such as coloring agents, fillers, and plasticizers. Such materials may be added in any expedient manner, before or after co-polymerization, depending on the effect such materials may have on the polymerization rate of the monomers or on the properties of the finished co-polymer.

Other modes of applying the principle of our invention may be employed instead of those explained, change being made as regards the materials or process employed, provided the ingredients or steps stated by any of the following claims or the equivalent of such stated ingredients or steps be employed.

We therefore particularly point out and distinctly claim as our invention:

1. A co-polymer of vinylidene chloride and other polymerizable materials at least one of which is selected from the group consisting of the allyl, 2-methyl-allyl, 2-chloroallyl, crotonyl, and cinnamyl esters of mono-carboxylic acids, wherein the amount of vinylidene chloride is greater than that of the therewith co-polymerized unsaturated ester.

2. A co-polymer of vinylidene chloride and an allyl ester of a monocarboxylic acid, wherein the amount of vinylidene chloride is greater than the amount of unsaturated ester co-polymerized therewith.

3. A co-polymer of vinylidene chloride and a 2-methyl allyl ester of a monocarboxylic acid, wherein the amount of vinylidene chloride is greater than the amount of unsaturated ester co-polymerized therewith.

4. A co-polymer of vinylidene chloride and a 2-chloroallyl ester of a monocarboxylic acid, wherein the amount of vinylidene chloride is greater than the amount of unsaturated ester co-polymerized therewith.

5. A co-polymer of vinylidene chloride and 2-chloroallyl crotonate, wherein the amount of vinylidene chloride is greater than the amount of unsaturated ester co-polymerized therewith.

6. A co-polymer of vinylidene chloride and allyl n-caproate, wherein the amount of vinylidene chloride is greater than the amount of unsaturated ester co-polymerized therewith.

7. The process which comprises polymerizing a mixture of monomers of vinylidene chloride and an unsaturated ester selected from the group consisting of the allyl, 2-methylallyl, 2-chloroallyl, crotonyl, and cinnamyl esters of monocarboxylic acids, in proportions such that the vinylidene chloride predominates.

8. The process which comprises mixing monomeric vinylidene chloride with the monomeric form of an allyl ester of a monocarboxylic acid in proportions such that the vinylidene chloride predominates, and subjecting the mixture to polymerizing conditions.

9. The process which comprises mixing monomeric vinylidene chloride with the monomeric form of a 2-methyl allyl ester of a monocarboxylic acid in proportions such that the vinylidene chloride predominates, and subjecting the mixture to polymerizing conditions.

10. The process which comprises mixing monomeric vinylidene chloride with the monomeric form of a 2-chloroallyl ester of a monocarboxylic acid in proportions such that the vinylidene chloride predominates, and subjecting the mixture to polymerizing conditions.

11. The process which comprises mixing monomeric vinylidene chloride with the monomeric form of 2-chloroallyl crotonate in proportions such that the vinylidene chloride predominates, and subjecting the mixture to polymerizing conditions.

12. The process which comprises mixing monomeric vinylidene chloride with the monomeric form of allyl n-caproate in proportions such that the vinylidene chloride predominates, and subjecting the mixture to polymerizing conditions.

EDGAR C. BRITTON.
CLYDE W. DAVIS.
FRED LOWELL TAYLOR.